(12) United States Patent
Morioka et al.

(10) Patent No.: US 7,884,860 B2
(45) Date of Patent: Feb. 8, 2011

(54) CONTENT SHOOTING APPARATUS

(75) Inventors: Yoshihiro Morioka, Nara (JP); Kenji Matsuura, Nara (JP); Takeshi Hamasaki, Osaka (JP); Michifumi Inai, Osaka (JP); Masakazu Mimura, Osaka (JP); Hisasi Inoue, Nara (JP); Masaaki Kobayashi, Hyogo (JP)

(73) Assignee: Panasonic Corporation, Osaka (JP)

( * ) Notice: Subject to any disclaimer, the term of this patent is extended or adjusted under 35 U.S.C. 154(b) by 496 days.

(21) Appl. No.: 12/067,453

(22) PCT Filed: Mar. 20, 2007

(86) PCT No.: PCT/JP2007/055604
§ 371 (c)(1),
(2), (4) Date: Mar. 19, 2008

(87) PCT Pub. No.: WO2007/108458
PCT Pub. Date: Sep. 27, 2007

(65) Prior Publication Data
US 2009/0110372 A1    Apr. 30, 2009

(30) Foreign Application Priority Data
Mar. 23, 2006    (JP)    ............... 2006-080273

(51) Int. Cl.
H04N 5/228    (2006.01)
H04N 5/76    (2006.01)
(52) U.S. Cl. ................... 348/231.6; 348/208.3
(58) Field of Classification Search ........... 348/208.1, 348/208.2, 208.3, 208.12, 208.16, 231.3, 348/231.6
See application file for complete search history.

(56) References Cited

U.S. PATENT DOCUMENTS

| | | | | |
|---|---|---|---|---|
| 5,805,212 A | * | 9/1998 | Fujiwara | ................... 348/208.8 |
| 6,078,726 A | | 6/2000 | Gotoh et al. | |
| 7,403,224 B2 | * | 7/2008 | Fuller et al. | .............. 348/231.3 |
| 7,486,879 B2 | * | 2/2009 | Moriya et al. | .................. 396/53 |
| 7,502,560 B2 | * | 3/2009 | Komori | ....................... 396/310 |

(Continued)

FOREIGN PATENT DOCUMENTS

JP    03-090968    4/1991

(Continued)

OTHER PUBLICATIONS

Extended European Search Report dated Oct. 28, 2009.

(Continued)

*Primary Examiner*—John M Villecco
(74) *Attorney, Agent, or Firm*—Dickinson Wright PLLC

(57) ABSTRACT

A content shooting apparatus is provided, in which thresholds for generating metadata concerning shot images can be calibrated in accordance with shooting conditions.

In a content shooting apparatus (Acc) for converting content data (Dc) into a stream (AV) and recording the stream (AV) to a recording medium (214) in combination with content-related metadata (Dm), a camera (101) shoots a subject (105) and generates the content data (Dc), a camerawork statistics portion (206s) detects movement (σ) of the camera, a camera microcomputer (206) compares the detected movement (σ) with a predetermined value (Th) to generate the metadata (Dm), and an automatic threshold setting portion (206t) changes the predetermined value (Th) in accordance with the detected movement (σ).

14 Claims, 8 Drawing Sheets

U.S. PATENT DOCUMENTS

| | | | |
|---|---|---|---|
| 7,756,409 B2 * | 7/2010 | Irinouchi et al. | 396/153 |
| 2002/0146245 A1 | 10/2002 | Masuda | |
| 2004/0086265 A1 | 5/2004 | Tojo | |
| 2004/0125229 A1 * | 7/2004 | Aoyama et al. | 348/345 |
| 2005/0228665 A1 | 10/2005 | Kobayashi et al. | |
| 2005/0231599 A1 | 10/2005 | Yamasaki | |
| 2007/0120986 A1 * | 5/2007 | Nunomaki | 348/222.1 |
| 2007/0294295 A1 * | 12/2007 | Finkelstein et al. | 707/104.1 |
| 2008/0019610 A1 | 1/2008 | Matsuzaka | |
| 2009/0024666 A1 * | 1/2009 | Wang et al. | 707/104.1 |
| 2009/0103898 A1 * | 4/2009 | Morioka et al. | 386/117 |
| 2009/0225174 A1 * | 9/2009 | Handa et al. | 348/208.3 |
| 2010/0091113 A1 * | 4/2010 | Morioka et al. | 348/207.1 |

FOREIGN PATENT DOCUMENTS

| | | |
|---|---|---|
| JP | 05-252432 | 9/1993 |
| JP | 06-165009 | 6/1994 |

OTHER PUBLICATIONS

International Search Report dated Apr. 24, 2007.

* cited by examiner

CONTENT SHOOTING APPARATUS

TECHNICAL FIELD

The present invention relates to content shooting apparatuses, and more specifically to a content shooting apparatus in which thresholds for generating metadata concerning images shot in accordance with camerawork during moving image shooting can be calibrated in accordance with shooting conditions.

BACKGROUND ART

Conventionally, movies, television dramas, etc., have been shot in accordance with scenarios (scripts) created based on storyboards, etc. The scenario has its title (name), and consists of a plurality of scenes. Also, the scene consists of a plurality of cuts. A director provides directions in accordance with the scenario, and performers, such as actors, actresses, and extras, act in accordance with descriptions in the scenario. In the cases of, for example, live stage acts and concerts, performance is carried out in order of scenes specified in the scenario. On the other hand, in the cases of movies, dramas, etc., shooting is rarely carried out in order of scenes specified in the scenario.

Accordingly, in many cases, each video cut is shot in a condition or state different from conditions or states for video cuts before and after that video cut. As a result, a piece of video footage might be made out of a series of video cuts connected in an unnatural manner. Minimal unnaturalness may be tolerable, but in some cases, such erroneous editing that misses unnatural connections might ruin the work (movie). Therefore, in order to prevent erroneous editing, it is necessary to take records of scene shooting, and appropriately manage shot scene information.

Specifically, editing after scene shooting is an extremely labor- and time-consuming task for completing a movie or drama, in which original content (video, audio, data) stored in a master medium (film, tape, optical disk, P2 card or SD card, or the like), which has video scenes recorded therein, is selected in accordance with the intent of a content creator with reference to the shot scene information recorded in handwriting by a scripter, an assistant director, or the like, and thereafter the content is subjected to edit processing, such as synthesizing, before reconnection of scenes. Therefore, there has been a demand to improve the efficiency of the editing task.

To meet the demand to improve the efficiency of the editing task, Patent Document 1 proposes a metadata input method and an edit system. Specifically, when generating content-related metadata or tagging content with metadata, keywords, which have been previously extracted from, for example, the scenario for the created content, are inputted by voice. Thereafter, a dictionary genre and the priority order of the keywords are determined in accordance with the scenario, and the metadata is generated by voice recognition means. This method employs voice recognition to allow efficient metadata assignment, even if the metadata is assigned at intervals of a few seconds, which is difficult to achieve by key input. The metadata can also be used as a keyword(s) for scene search.

In addition, a device for analyzing scenario information, as described in Patent Document 2, is known. This device includes a scenario information storage portion, a reference information storage portion, a calculation portion, and an output portion. The information storage portion stores scenario information sorted by scene. The reference information storage portion stores reference information concerning data contained in the scenario information. The calculation portion extracts data from the scenario information, and calculates output information based on the extracted data and the reference information before outputting to the output portion.

Based on data contained in the scenario and reference information related to that data, the scenario information analyzing device thus configured is capable of automatically calculating and outputting output information, such as an appropriate shooting schedule, as well as analyzing the scenario information. Thus, it is possible to shorten a time period for arranging a shooting schedule, as well as to expeditiously complete shooting by carrying out the shooting in accordance with the outputted shooting schedule, making it possible to reduce the cost of shooting.

Patent Document 1: Japanese Patent No. 3781715
Patent Document 2: Japanese Laid-Open Patent Publication No. 2004-362610

DISCLOSURE OF THE INVENTION

Problem To be Solved by the Invention

In conventional apparatuses and methods as typified by Patent Documents 1 and 2, metadata is generated by camerawork patterns, such as panning and zooming, recorded sound, user operations, etc., at characteristic scenes between the start and the end of clip recording during shooting of moving images. The generated metadata is listed. After the end of the clip recording, a digest consisting of related clips can be generated using metadata in the list.

Essentially, thresholds for evaluating metadata generation triggers, such as camerawork patterns, recorded sound, and user operations, should be appropriately modified by individual users or content shooting apparatuses, and furthermore, even in the case of the same user or content shooting apparatus, the thresholds should be modified depending on subjects. However, there is no concept of dynamically and flexibly adjusting thresholds for metadata generation, and therefore the thresholds for metadata generation are fixed. Accordingly, there are variations in metadata generation among users or content shooting apparatuses, or depending on subjects, resulting in a problem where shot scenes cannot be flexibly and appropriately classified based on metadata. Therefore, an objective of the present invention is to provide a content shooting apparatus in which thresholds for generating metadata concerning shot images can be calibrated in accordance with shooting conditions.

Means for Solving the Problem

To achieve the above objective, the present invention provides a content shooting apparatus for converting content data containing video, audio, or data into a stream and recording the stream to a recording medium in combination with content-related metadata, the apparatus comprising:

shooting means for shooting a subject and generating the content data;

camerawork detection means for detecting movement of the shooting means;

metadata generation means for comparing the detected movement with a predetermined value to generate the metadata; and calibration means for changing the predetermined value in accordance with the detected movement.

Preferably, the content shooting apparatus of the present invention further comprises shooting means placement determination means for determining placement of the shooting means based on the movement detected during a predetermined period of time.

Preferably, the content shooting apparatus of the present invention further comprises an angular velocity sensor for detecting a rotational angular velocity of the shooting means, wherein the movement is detected based on the detected rotational angular velocity.

Preferably, the content shooting apparatus of the present invention further comprises content classification means for classifying video or audio corresponding to the detected movement as invalid content when the detected movement is greater than the predetermined value.

Effect of the Invention

The content shooting apparatus according to the present invention makes it possible to calibrate thresholds for generating metadata concerning shot images in accordance with shooting conditions.

BEST MODE FOR CARRYING OUT THE INVENTION

Figure 1:
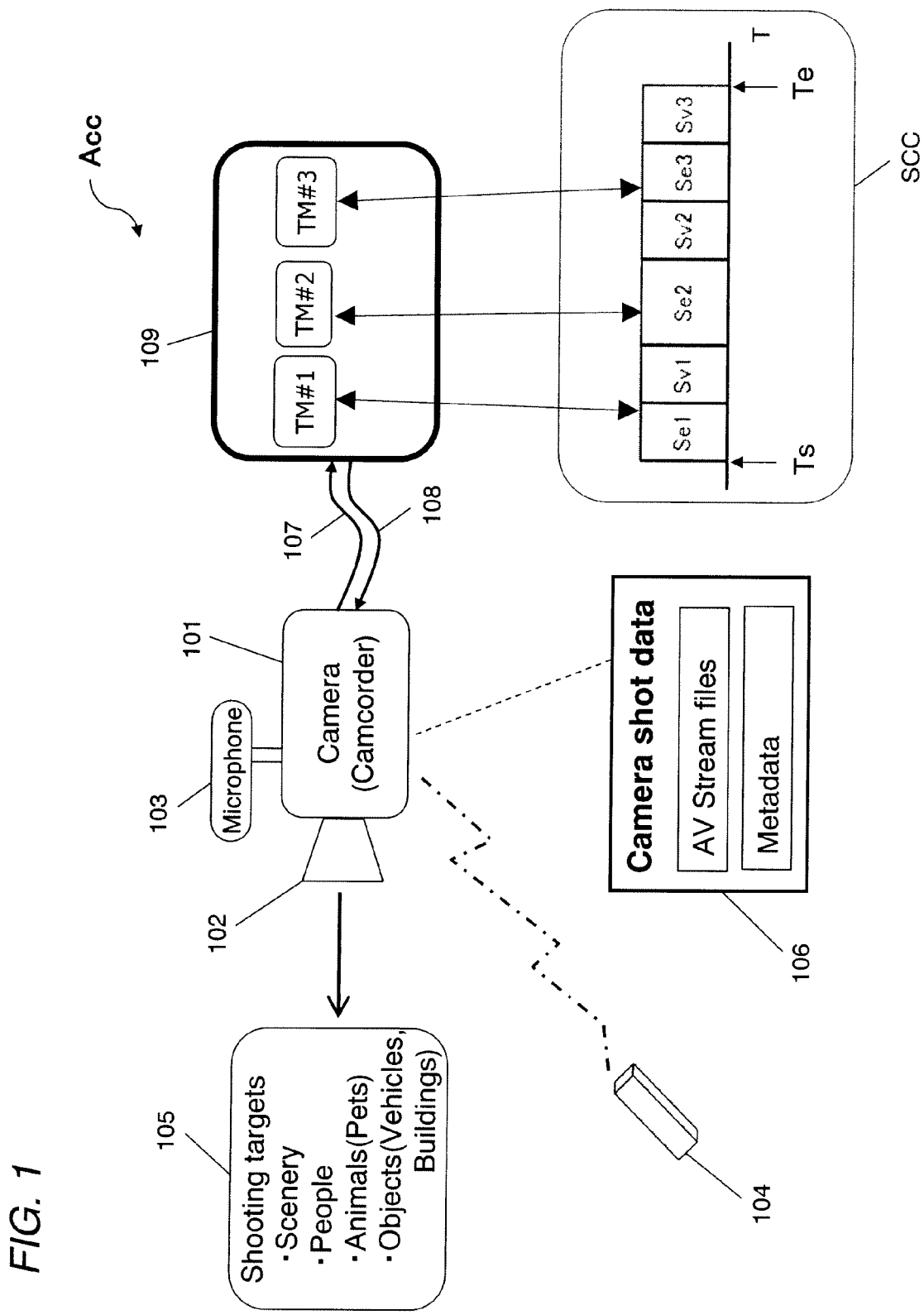
FIG. 1 is a model diagram of a content shooting apparatus according to an embodiment of the present invention.

A content shooting apparatus according to an embodiment of the present invention will be described with reference to FIG. 1. In FIG. 1, a content shooting apparatus Acc is depicted as an exemplary system model with an edit function of, for example, generating video data, audio data, and metadata on a recording medium (or a buffer memory) in a camera 101, and deleting any invalid scene, or generating a digest, based on the generated metadata. The content shooting apparatus Acc preferably includes the camera 101 and a television set 109. The television set 109 may be any display means connected to the camera 101 and capable of video display and/or audio playback.

The camera 101 includes a lens portion 102 and a microphone 103. The camera 101 shoots shooting targets 105 in response to user operations on a remote control 104. The shooting targets 105 are subjects, e.g., scenery, people, animals, such as pets, vehicles, and buildings. Note that the camera 101 may include an operation device with a function equivalent to that of the remote control 104. Camera shot data 106 is generated based on shot images. The camera shot data 106 contains AV stream data files, which are video/audio data for the shot images, as well as metadata.

Note that signal transmission from the camera 101 to the television set 109 is carried out via a connection cable 107, while signal transmission from the television set 109 to the camera 101 is carried out via a connection cable 108. The user operates the remote control 104 at a location away from the camera 101 to display representative thumbnail screen images of important scenes contained in a digest on the television set 109 via the signal cable 107, or to play back content with invalid portions being deleted, or play back a digest (or a content summary).

In FIG. 1, exemplary displays on the television set 109 are shown as thumbnails TM#1, TM#2, and TM#3. A concept (scene classification concept SCC) of classifying valid scenes Se and invalid scenes Sv, which correspond to their respective thumbnails TM, is shown. In the classification concept SCC, the horizontal axis denotes time T, so that valid portions (valid scenes Se1, Se2, and Se3) and invalid portions (invalid scenes Sv1, Sv2, and Sv3) are indicated on that time axis. The valid scene Se1 and the invalid scene Sv1 correspond to the thumbnail TM#1, the valid scene Se2 and the invalid scene Sv2 correspond to the thumbnail TM#2, and the valid scene Se3 and the invalid scene Sv3 correspond to the thumbnail TM#3. Specifically, shooting by the camera 101 starts at time Ts, and ends at time Te.

For each of the valid scenes Se1, Se2, and Se3, and the invalid scenes Sv1, Sv2, and Sv3 in FIG. 1, clip processing can be facilitated by replacing the scene with the temporally closest I-picture in a GOP structure in terms of the start time and the end time.

For example, if the start times and the end times of the valid scenes Se1, Se2, and Se3, and the invalid scenes Sv1, Sv2, and Sv3 are such that:

(start time of Se1, end time of Se1)=(Se1$s$,Se1$e$);
(start time of Se2, end time of Se2)=(Se2$s$,Se2$e$);
(start time of Se3, end time of Se3)=(Se3$s$,Se3$e$);
(start time of Sv1, end time of Sv1)=(Sv1$s$,Sv1$e$);
(start time of Sv2, end time of Sv2)=(Sv2$s$,Sv2$e$); and
(start time of Sv3, end time of Sv3)=(Sv3$s$,Sv3$e$), then the start times and the end times in the case of the scene arrangement in FIG. 1 are given such that:

(end time of Se1)=(Se1$e$)=(start time of Sv1)=(Sv1$s$);
(end time of Sv1)=(Sv1$e$)=(start time of Se2)=(Se2$s$);
(end time of Se2)=(Se2$e$)=(start time of Sv2)=(Sv2$s$);
(end time of Sv2)=(Sv2$e$)=(start time of Se3)=(Se3$s$); and
(end time of Se3)=(Se3$e$)=(start time of Sv3)=(Sv3$s$).

The valid portions (valid scenes Se) include, for example:
fixed scenes after panning or zooming; and
scenes characterized by sound, such as cheers or handclaps.

On the other hand, the invalid portions (invalid scenes Sv) include, for example:
scenes with highly blurred (generally "unstable") images caused by camera jiggle;
out-of-focus scenes, scenes shot with excessively quick panning/tilting/zooming;
scenes with screen images darkened by backlight;
scenes with acoustic howling;
scenes shot by pointing at the ground; and
scenes taken with a cap on the camera.

As for images of the invalid portions (invalid scenes Sv) as described above, those with common sense and feelings would almost universally recognize that such images do not need to be played back. This is conceivably because value judgment about unacceptable matters generally greatly relies on human physiological perception and recognition mechanisms, and such value judgment is almost universal around the world. Therefore, any invalid portions (invalid scenes Sv) are desirably omitted at the time of digest playback, for example.

For selection of invalid scenes from shot images, the present invention employs an algorithm that handles the scenes or images individually, but if a plurality of invalid scenes Sv are present at predetermined intervals and valid scenes Se are present between the invalid scenes Sv, the algorithm also handles the valid scenes Se collectively as invalid scenes Sv. Concretely, when shot images (data) contain one invalid scene Sv, and another invalid scene Sv within 60 video frames from that scene, all intervening valid scenes Se are handled as invalid scenes Sv (invalid portions).

A section in which the valid scene Se is handled as the invalid scene Sv as described above is referred to as an invalid scene section Psv. In addition, a scene S contained in the invalid scene section Psv is referred to as an invalid section scene Spv, regardless whether it is a valid scene Se or an invalid scene Sv. That is, the invalid scene section Psv may contain two invalid scenes Sv and one valid scene Se.

The reason why a plurality of scenes S within a predetermined interval (in the present example, 60 video frames) are handled as invalid section scenes Spv (invalid scene sections Psv) as described above is because joining discontinuous video images within 60 frames results in hurried and rushed video. As for scene information concerning the invalid section scenes Spv contained in the invalid scene section Psv, the type of metadata with the highest priority in the invalid scene Sv, the time of the invalid scene Sv, and the period of the invalid scene Sv (the length of the invalid section scene Spv) are all used, as detailed descriptions of the scene information, for playlist marker information (which can be used for marker skip), auxiliary data associated with an algorithm for selecting the marker information, and so on.

Note that the number of invalid scenes Sv can be preset in accordance with the length of content. For example, it is possible to set the number of invalid scenes Sv, such as five scenes per minute, and up to maximum of 100 scenes. In addition, it is possible to specify the type of the invalid scene Sv, and a reduction rate per content. Furthermore, in the case of shooting stable video using a tripod stand or suchlike, the shooting can be carried out with an invalid scene detecting function being manually turned OFF.

Described next is an example of detecting important scenes. It is possible to create an algorithm for extracting a fixed portion of one to three seconds at the beginning (CLIP-IN) or the end (CLIP-OUT) of a shot clip as an important portion (scene). It is also possible to create an algorithm for extracting sound detection metadata (a metadata portion for a detected input from a main or sub microphone, such as voice, sound of a clapperboard, gunshot, or cheers) as an important portion (scene).

Furthermore, it is possible to detect a fixed (static) scene after panning or tilting of the camera 101 based on an output from a gyro sensor included in the camera 101. The fixed scene (a portion in which the camera operator has shot a fixed video image with interest; a portion of interest) can be extracted. It is also possible to detect a zoomed-in or zoomed-out portion (scene) by monitoring a change in the zoom value of the camera 101 over time.

More specifically, it is possible to create an algorithm for extracting a fixed portion of one to three seconds before or after zooming in or zooming out as an important portion (scene). It is also possible to detect a scene shot by panning or tilting the camera based on an output from the gyro sensor. Furthermore, it is possible to divide a shot video image obtained from an image sensor into a plurality of blocks, and detect information that indicates, for each block, whether hue and chromaticity are within their predetermined ranges. For example, it is possible to detect a human face based on the size and shape of a detected block, and the degree of skin tone. Moreover, it is possible to detect a human face with higher accuracy based on the shape of a detected block and the degree of skin tone in a fixed video image after panning, tilting, or zooming.

The point to be noticed is that recognition of the important scene under the above-described conditions may slightly vary between those without skill in shooting and those skilled in camerawork for shooting, even if both of them have common sense and feelings. That is, those skilled in shooting carry out shooting, considering camerawork according to video shooting techniques, whereas those without skill do not have such knowledge, so that it is often the case that they shoot a subject without taking camerawork into consideration. However, it is usually the case that even those without skill gradually learn commonly acknowledged camerawork through advice from others and their own findings as they experience shooting.

Also, as for sorting of high-priority scenes, more stable scene sorting is made possible by sorting the high-priority scenes out from content with any low-priority scenes having been previously excluded therefrom. For example, in the case of scenes that are considered to be valid as high-priority scenes in a zoomed-in, fixed portion, if they are out of focus, such low-priority scenes can be preferentially excluded.

Similarly, in some cases, scenes that are considered to be valid as high-priority scenes in a zoomed-in, fixed portion have screen images darkened by backlight. Such low-priority scenes can be preferentially excluded. Also, in the case of scenes of a footrace in an athletic meet that are considered to be valid as high-priority scenes because a starter's gun shot is detectable, if they are unwatchable because of excessively quick zooming-in or panning, such low-priority scenes can be preferentially excluded.

As described above, a playlist is generated as the first step, so as to consist of stably shot scenes excepting any low-priority scenes. Next, as the second step, any high-priority scenes are sorted out from among the stable scenes. For example, the high-priority scenes are added to the playlist created by the first step to sort important scenes out from the content with any invalid portions having been excluded therefrom. With the above steps, it becomes possible to sort out visually more stable important scenes free from jiggle, out-of-focus blurring, etc.

Metadata for invalid scenes may be processed with a negative sign because of its negative meaning of "invalid". However, in this case also, the above-described invalid scene calculation algorithm (a process for bundling a plurality of invalid scenes Sv in an invalid section scene Spv) differs from the important scene calculation algorithm (a process for determining a representative scene from among a plurality of important scenes, and calculating the priority of the representative scene), and these processes cannot be implemented by the same algorithm. Note that any scene with a value between the high-priority scene (important scene) and the low-priority scene (invalid scene) can be handled as an ordinary scene (common scene).

Note that in the example shown in FIG. 1, for the three valid portions (the valid scenes Se1, Se2, and Se3) in the list displayed on the television set 109, the thumbnails TM#1, TM#2, and TM#3 are displayed on the screen to represent their respective representative clips. Each of these representative clips may be the first frame of its valid portion, or a representative frame within the valid portion. In addition, their valid portions and invalid portions are assigned their respective priorities, so that a digest can be generated by selecting only scenes with a specific priority.

Figure 2:
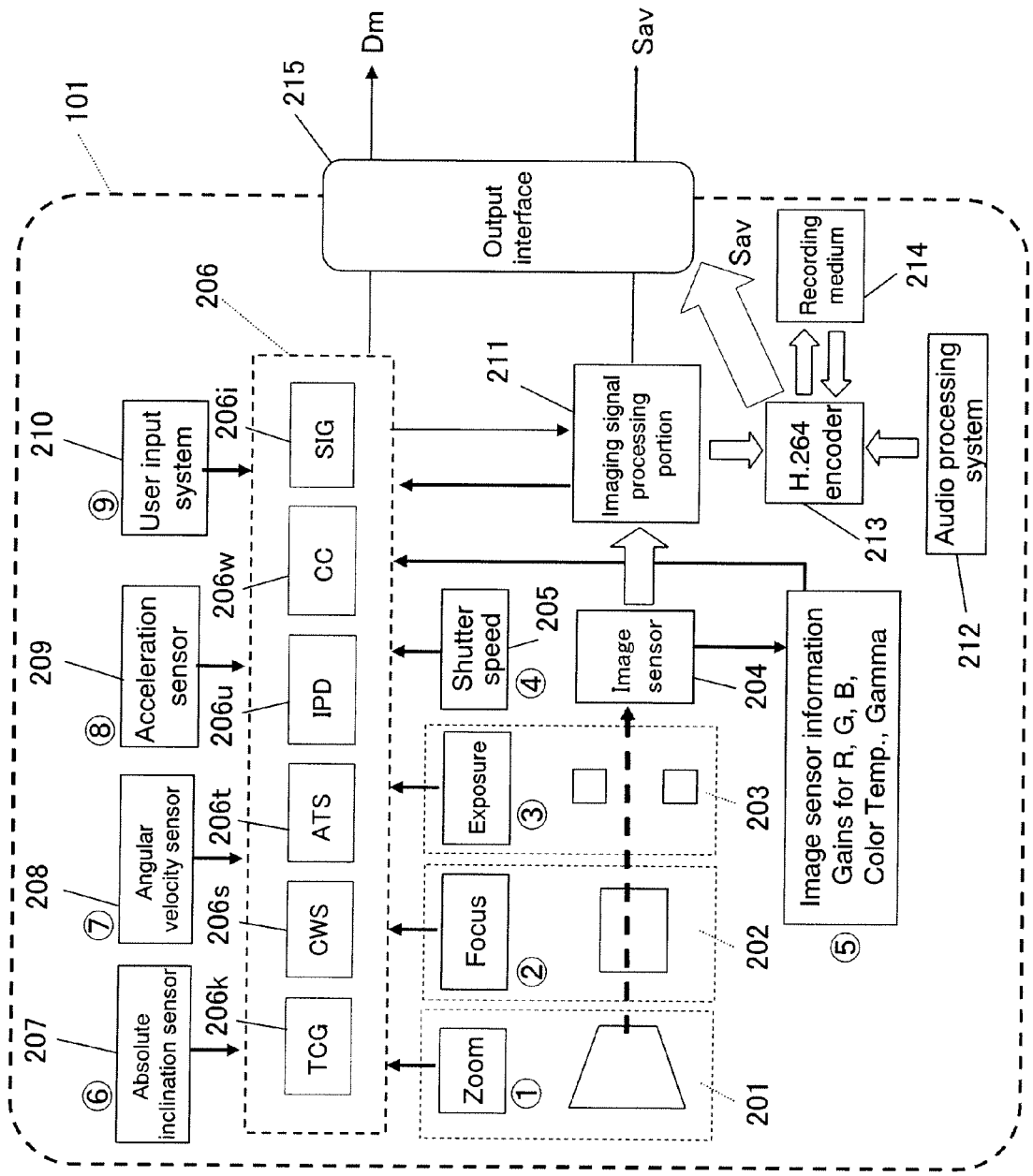
FIG. 2 is a diagram for explaining the internal configuration of a camera shown in FIG. 1.

Next, the internal configuration of the camera 101 will be described with reference to FIG. 2. Provided in the camera 101 are a zoom control portion 201, a focus control portion 202, an exposure control portion 203, an image sensor 204, a shutter speed control portion 205, a camera microcomputer 206, an absolute inclination sensor 207, an angular velocity sensor 208, a forward-backward/rightward-leftward/upward-downward acceleration sensor 209, a user input system 210, a camera signal processing portion 211, an audio processing system 212, an H.264 encoder 213, a recording medium 214, and an output interface 215.

The camera microcomputer 206 includes, as software algorithms, a time code generation portion 206k, a camerawork statistics portion 206s, an automatic threshold setting portion 206t, an imaging means placement determination portion 206u, a content classification portion 206w, and a scene information generation portion 206i (index generation means). The scene information generation portion 206i subjects data concerning panning, tilting, zooming, focus, audio input level, etc., of the imaging device to arithmetic operations specific thereto, thereby detecting the invalid scene and the important scene.

Note that because of limitations of space, the time code generation portion, the camerawork statistics portion, the automatic threshold setting portion, the imaging means placement determination portion, the content classification portion, and the scene information generation portion are respectively indicated as "TCG", "CWS", "ATS", "IPD", "CC", and "SIG" in the figure.

The zoom control portion 201 controls a zooming operation of the lens portion 102. The focus control portion 202 controls a focus operation of the lens portion 102. The exposure control portion 203 controls an exposure adjustment operation of the lens portion 102. The shutter speed control portion 205 controls a shutter speed adjustment operation of the image sensor 204. The absolute inclination sensor 207 detects horizontal/vertical absolute inclinations of the camera 101. The angular velocity sensor 208 detects horizontal/vertical angular velocities of the camera 101. The acceleration sensor 209 detects forward-backward/rightward-leftward/ upward-downward accelerations of the camera 101.

The user input system 210 generates an instruction signal in response to a user operation on a button or suchlike. In addition, the imaging signal processing portion 211 includes encoding means for MPEG2, H.264/AVC, etc. Note that the H.264/AVC scheme is described in detail, for example, in "H.264/AVC Kyokasho [Instructional Textbook on H.264/AVC]", edited by Sakae Okubo, published by Impress, Inc. Also, the MPEG-TS signal is defined by IEC 61883-4.

An example of the references for TS formats, such as PAT and PMT of the MPEG-TS standards, is "Gazo & Onsei Asshuku Gijyutsu No Subete (Internet/Digital Television, Mobile Tsuushin Jidai No Hisshuu Gijyutsu) ["All About Image and Audio Compression Techniques (Essential Techniques for the Era of Internet/Digital Television, Mobile Communication)"], TECH I Vol. 4, edited by Hiroshi Fujiwara, CQ Publishing Co., Ltd., Chapter 6, "Gazo Ya Onsei Wo Tajyuukasuru MPEG system [MPEG System for Image and Audio Multiplexing]", which provides explication of the TS formats. Also, hierarchical structures of PSI and SI, exemplary procedures, exemplary tuning processes are described in "Tuning Technology for Digital Broadcast Receiver", Miyake et al., SANYO Technical Review, VOL. 36, June, 2004, the No. 74 edition, pp. 31 to 44.

The angular velocity sensor 208 will be described. The angular velocity sensor 208 is generally composed of a gyro sensor, which detects the rotational accelerations with respect to three rotational axes "roll", "pitch", and "yaw". Calibration of detection sensitivity for the rotational accelerations is important. Recently, gyro sensors that are subjected to auto calibration have been commercialized, and, for example, the auto calibration is carried out a few seconds after power activation.

The calibration of detection sensitivity for cameras including a gyro sensor is carried out considering variations among individual sensor devices, variations in detection sensitivity due to temperature, and variations in change of supply voltage. The calibration is carried out by providing vibration of a predetermined magnitude under predetermined conditions, and reducing the difference from an expected value for the sensor output at that time to a tolerance or lower. Such calibration can be carried out at factories.

As an auto calibration method, the amplifier gain can be adjusted for an output amplitude in the case of jiggle, such that sensor outputs are constant at a normal calibration frequency. The normal calibration frequency can be provided, for example, by using a vibrator at a secure vibration level. Vibration devices for signaling an incoming call when cell phones are in silent mode can also be used so long as their vibration levels are regulated. It is understood that any vibration sources with known vibration levels can be used as calibration means. Note that the calibration can be carried out with higher accuracy by using a plurality of vibration levels (e.g., three levels, such as high, mid, and low).

As an operation parameter, the image sensor 204 has image sensor operation data concerning at least one of the following: chromaticity space information at three primary color points; white color coordinates; gain information concerning at least two of the three primary colors; color temperature information; $\Delta uv$ (delta uv); and gamma information concerning a three-primary color signal or a luminance signal. In the present embodiment, chromaticity space information at three primary color points, gain information concerning R (red) and B (blue) from among the three primary colors, and gamma curve information concerning G (green) are handled by way of example as metadata.

Note that if the chromaticity space information at three primary color points is known, it is possible to know the range in which color reproduction in a color space is possible. In addition, if the gain information concerning R (red) and B (blue) from among the three primary colors is known, it is possible to know color temperatures. Furthermore, if the gamma curve information concerning G (green) is known, it is possible to know half-toning characteristics. A sensor dedicated to color temperature detection may be provided such that the color temperature information is received from that sensor.

Lens zooming information, lens focus information, lens exposure information, image sensor shutter speed information, horizontal/vertical absolute inclination information, horizontal/vertical angular velocity information, forward-backward/rightward-leftward/upward-downward acceleration information, information concerning buttons used by the user for input, information concerning scene numbers, cut numbers, and take numbers, as well as acceptance, rejection, abeyance, etc., of the recorded takes, the chromaticity space information at three primary color points, the gain information concerning R (red) and B (blue) from among the three primary colors, and the gamma curve information concerning G (green) are handled by the camera microcomputer 206 as metadata Dm (referred to as camera metadata).

Image data, which is information taken by the image sensor 204, is subjected to processing, such as pixel defect correction and gamma correction, in units of pixel or in units of block consisting of a plurality of pixels, by the camera signal processing portion 211, as well as to compression by an H.264/AVC encoder or such like before being stored to the recording medium 214 along with the aforementioned camera metadata. In addition, an AV signal Sav, which is generated by the H.264 encoder 213, and the camera metadata Dm, which is generated by the camera microcomputer 206, are individually outputted from the output interface 215.

Described next is metadata Dm to be created during shooting of moving images by the camera 101. Real-time metadata that is mapped to SEI in an H.264 stream includes, for example:

- metadata associated with AV content shot by a camera, such as a camcorder;
- metadata, in general, obtained by converting data into metadata format;
- metadata obtained from SI (service information) in digital broadcasting;
- metadata, such as EPG information, obtained from EPG providers; and
- metadata, such as EPGs, obtained from the Internet.

Examples of the metadata associated with AV content shot by a camera include:

- information concerning buttons pressed by the user at important scenes (by which identification information, such as numbers, can be assigned);
- shooting data;
- time codes (video frames, audio frames); and
- video and audio format information, such as shooting frame rate, recording frame rate, etc.

Note that the shooting data concerns image sensor operation mode, backlight correction, aperture/exposure information, focus, shutter speed information, color temperature, white balance, zooming, elevation angle, shooting or not shooting of the ground, unstable jiggling, blurring, pan/tilt/zoom (abbreviated as "PTZ") status, acoustic howling status, camera-cap-closed status, and camera posture status (horizontal/vertical absolute inclination information, horizontal/vertical angular velocity information, forward-backward/rightward-leftward/upward-downward acceleration information, etc.).

In addition, non-real-time metadata includes, for example:
- menu information;
- a title list (representative events, events registered by the user);
- a scene numbers, cut numbers, take numbers, information concerning acceptance, rejection, abeyance, etc., of recorded takes;
- luminance and color information for video blocks;
- image recognition data (detection and recognition of faces, people, pets, etc.);
- audio input levels (maximum input levels for a designated channel during prescribed periods);
- audio recognition data;
- imaging system operation data, such as chromaticity space information at three primary color points of the image sensor, white color coordinates, gain information concerning at least two of the three primary colors, color temperature information, and Auv (delta uv);
- files inputted through external communication (texts, such as scenarios, which have been inputted in XML or binary data files via an external interface);
- gamma information for three-primary-color or luminance signals;
- still images; and
- thumbnails.

Of the above-described metadata, any necessary data is selected for use. The metadata can be described in the formats of property or attribute as adopted by UPnP and UPnP-AV. Such description formats are open to the public on http://upnp.org, and an efficient operation can be achieved by designing, considering use of text and XML (Extensible Markup Language).

Note that in order for a shooter of moving images or the like, a content creator, or a content copyright owner, to add value to each piece of metadata and collect viewing fees from content users depending on their usage details and content viewing frequencies, value-adding metadata can be associated with that piece of metadata. For each piece of metadata, the value-adding metadata may be provided as an attribute of the metadata or as an individual property.

Exemplary information related to recording equipment and recoding conditions will be described below. Such information includes camcorder manufacturer discrimination ID, device type discrimination ID, the name of a shooter of moving images or the like, the name of a content creator, etc. Furthermore, if metadata generated and registered by a content copyright owner is highly valuable, and therefore the content copyright owner considers the necessity of licensing, any feature for executing a process of giving a license to use the metadata through authentication can be incorporated into the configuration of the present invention, thereby making it possible to achieve an efficient operation.

In such a case, the shooter may create a file by encrypting the shot moving image content, and open the file to the public by uploading it onto a server on the Internet. It is also possible that the encrypted file is uploaded for posting, such that those who have interest in the file can purchase it. In the case where any content with a news value, such as accident video, has been recorded, the content can be auctioned among broadcast stations. By utilizing the metadata, it becomes possible to achieve efficient classification and search of an increasing amount of content.

Figure 3:
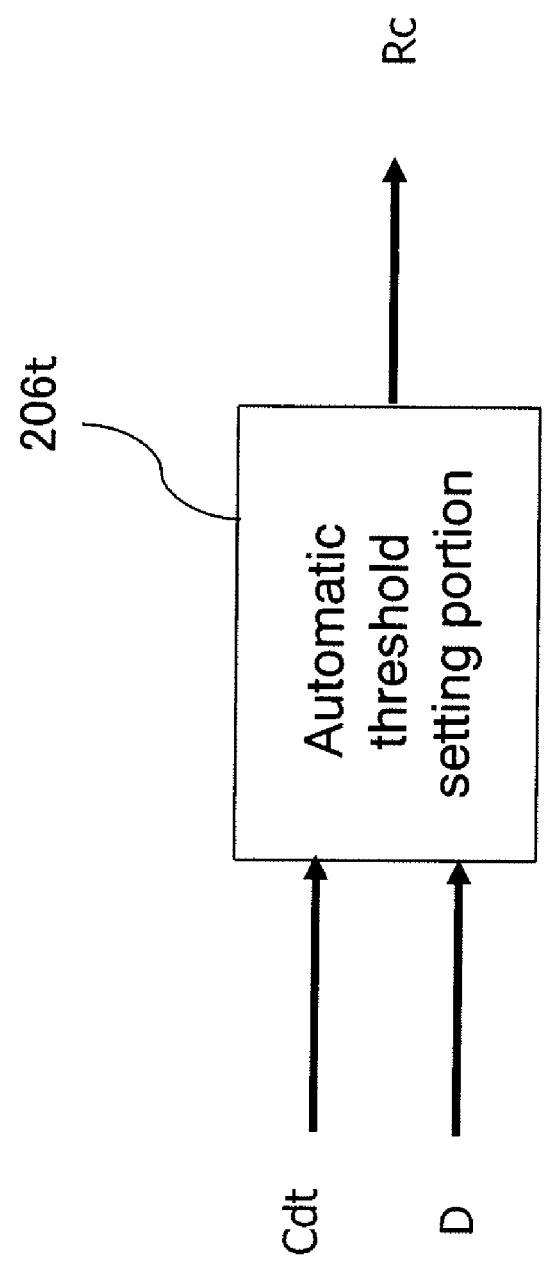
FIG. 3 is a diagram for explaining an automatic threshold setting portion.

The automatic threshold setting portion 206t will be described with reference to FIGS. 3, 4, and 5. As shown in FIG. 3, the automatic threshold setting portion 206t outputs a data classification result Rc to the scene information generation portion 206i based on an inputted threshold setting condition Cdt and inputted data D such as metadata. Note that the threshold setting condition Cdt contains a threshold setting condition Cst and a target classification rate Tcr (FIG. 4).

Figure 4:
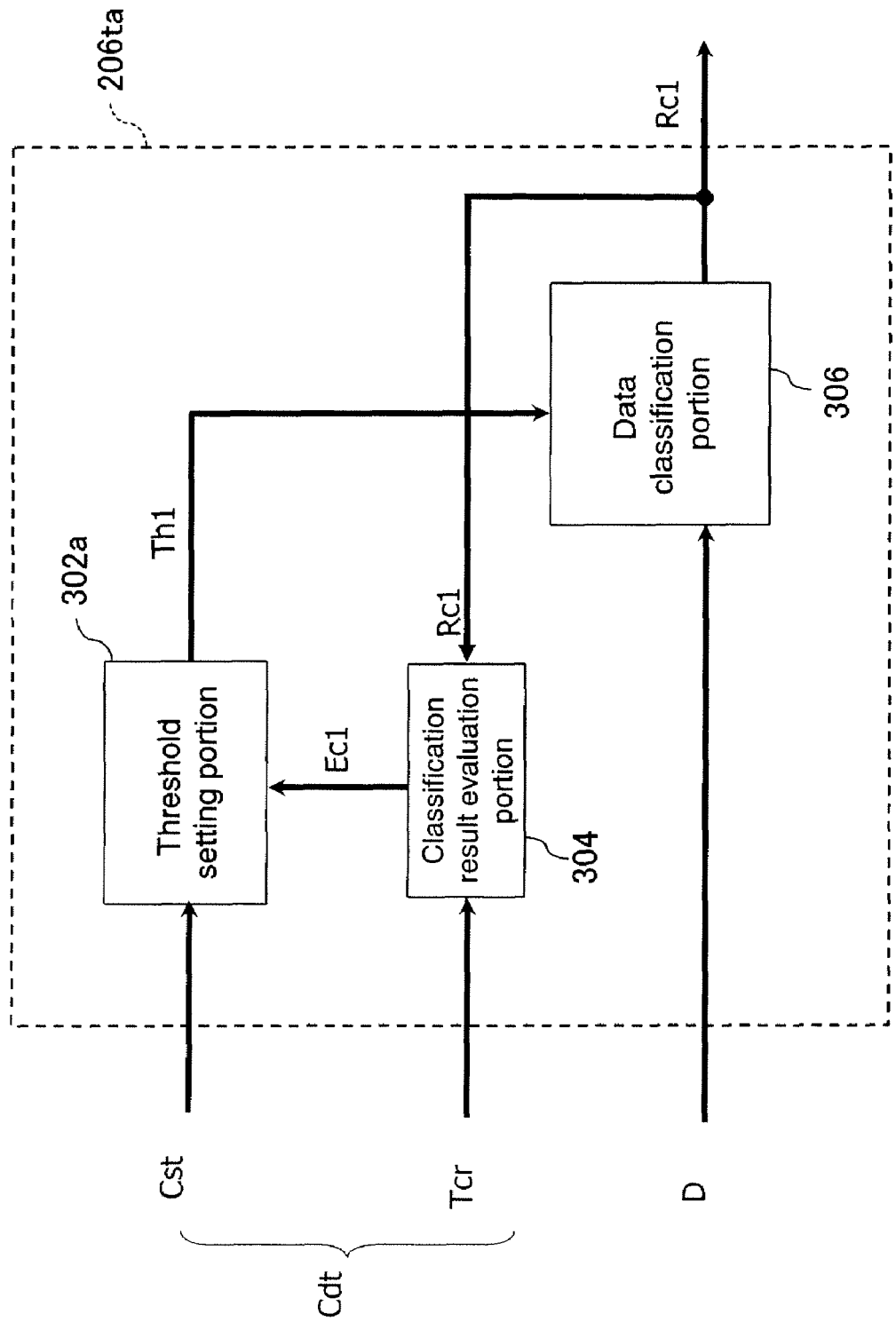
FIG. 4 is a block diagram illustrating the configuration of the automatic threshold setting portion.

FIG. 4 illustrates the configuration of an automatic threshold setting portion 206ta as an example of the automatic threshold setting portion 206t. The automatic threshold setting portion 206ta includes a threshold setting portion 302a, a classification result evaluation portion 304, and a data classification portion 306. The threshold setting condition Cst contained in the threshold setting condition Cdt is inputted to the threshold setting portion 302a. The target classification rate Tcr contained in the threshold setting condition Cdt is inputted to the classification result evaluation portion (indicated as "CRE" in FIG. 4) 304. The data D is inputted to the data classification portion 306.

The threshold setting portion 302a generates a threshold Th1 in accordance with the threshold setting condition Cst, as well as a classification error Ec1 inputted from the classification result evaluation portion 304. The classification result evaluation portion 304 generates the classification error Ec1 in accordance with the target classification rate Tcr, as well as a data classification result Rc1 inputted from the data classification portion 306. The data classification portion 306 generates the data classification result Rc1 in accordance with the data D, as well as the threshold Th1 inputted from the threshold setting portion 302a. Concretely, the data classification portion 306 generates the data classification result Rc1 by comparing a square mean value of either the moving speed or rotational speed of the shooting means (101), or both, with the noise power threshold (Th).

That is, the classification result evaluation portion 304 feeds back to the threshold setting portion 302a the difference (the classification error Ec1) between the evaluation result (the data classification result Rc1) from the data classification portion 306 and the preset value (the target classification rate Tcr). Thereafter, the threshold setting portion 302a carries out control such that statistics (time average value, dispersion value, etc.) for the data classification result Rc1 approximate to their target values. As such, by monitoring camerawork, such as panning and zooming, for a prescribed period of time during shooting of moving images, the imaging means placement determination portion 206u automatically determines a camera fixing status, e.g., whether the camera is held in hand or stabilized by a tripod stand, and automatically sets the threshold Th1 to determine whether the camerawork is normal or abnormal. That is, by determining the state, e.g., "held in hand" or "stabilized by a tripod stand", it becomes possible to automatically set the threshold Th for camerawork determination.

Figure 5:
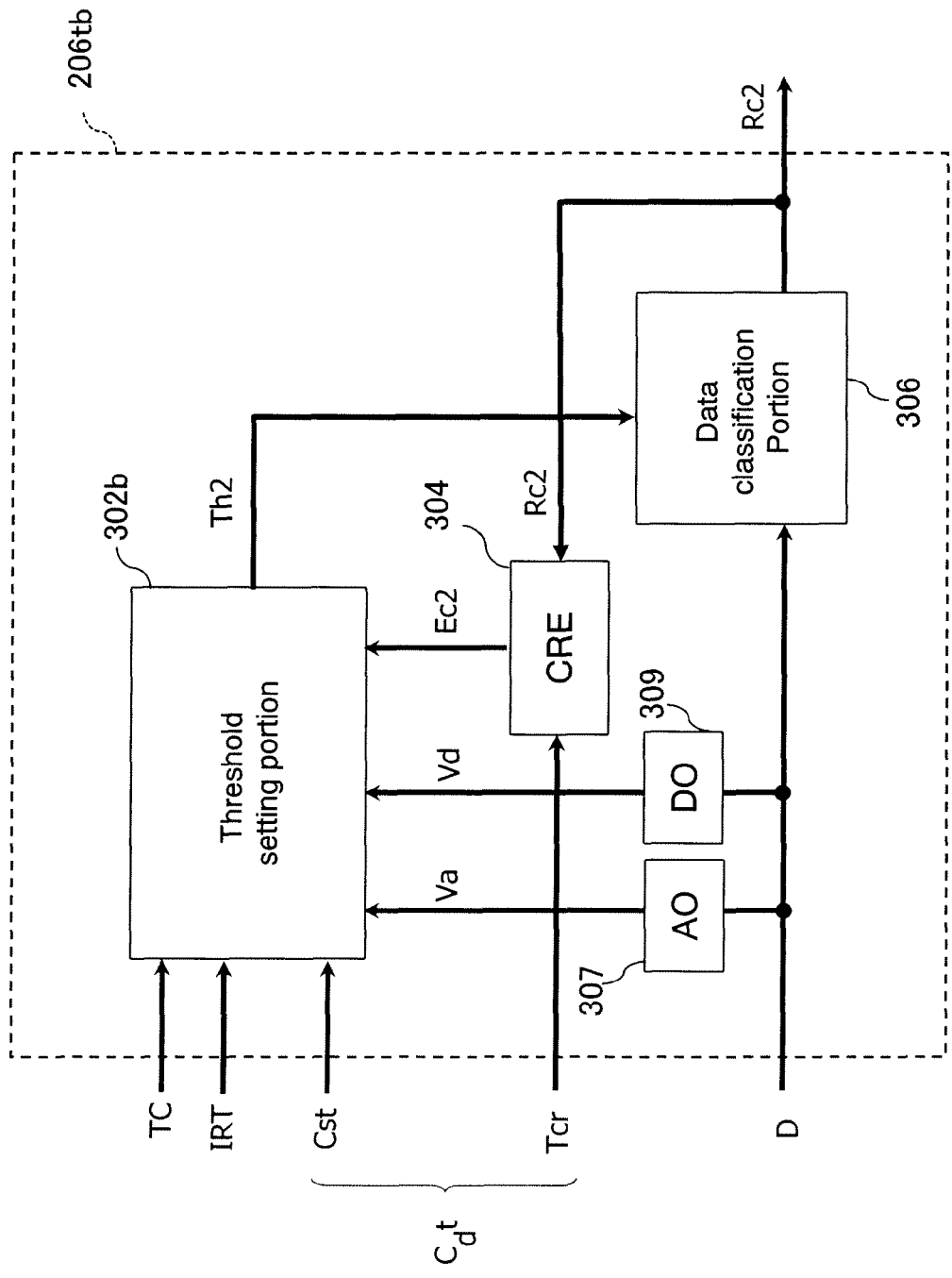
FIG. 5 is a block diagram of an automatic threshold setting portion configured differently from that shown in FIG. 4.

FIG. 5 illustrates the configuration of an automatic threshold setting portion 206tb as an example of the automatic threshold setting portion 206t different from the automatic threshold setting portion 206ta shown in FIG. 4. The automatic threshold setting portion 206tb has a threshold setting portion 302b, which replaces the threshold setting portion 302a of the automatic threshold setting portion 206ta, and it additionally includes an average operator portion 307 and a dispersion operator portion 309. A time code TC and recording start/end information IRT are inputted to the threshold setting portion 302b, along with the threshold setting condition Cst. The data D is inputted to both the average operator portion 307 and the dispersion operator portion 309, which respectively output average data Va, an average value of the data D, and dispersion data Vd, a dispersion value of the data D, to the threshold setting portion 302b. Note that because of limitations of space, the classification result evaluation portion, the average operator portion, and the dispersion operator portion are respectively indicated as "CRE", "AO", and "309" in the figure.

The threshold setting portion 302b generates a threshold Th2 based on the time code TC, the recording start/end information IRT, the threshold setting condition Cst, the average data Va, the dispersion data Vd, and a classification error Ec2. The data classification portion 306 generates a data classification result Rc2 based on the data D and the threshold Th2. The classification result evaluation portion 304 generates the classification error Ec2 based on the data classification result Rc2 and the target classification rate Tcr. As such, the automatic threshold setting portion 206tb uses more parameters than those for the automatic threshold setting portion 206ta to determine the threshold Th2 for data classification, making it possible to carry out more accurate data classification.

The camerawork statistics portion 206s included in the camera microcomputer 206 will be described with reference to FIGS. 6 and 7. The camerawork statistics portion 206s monitors or records user camerawork, such as panning, zooming, and fixing. If shooting camerawork during a predetermined period of time in the past, for example, the last five minutes, is only zooming-in, the shooter is reminded of zooming out to shoot global video images by an indication on a camera viewfinder. That is, the shooter is assisted such that balanced shooting can be carried out. As a result, when generating a digest of shot content, it is possible to obtain more well-balanced shot content, such that the digest is not constituted by only zoomed-in, panned, or fixed scenes.

Figure 6:
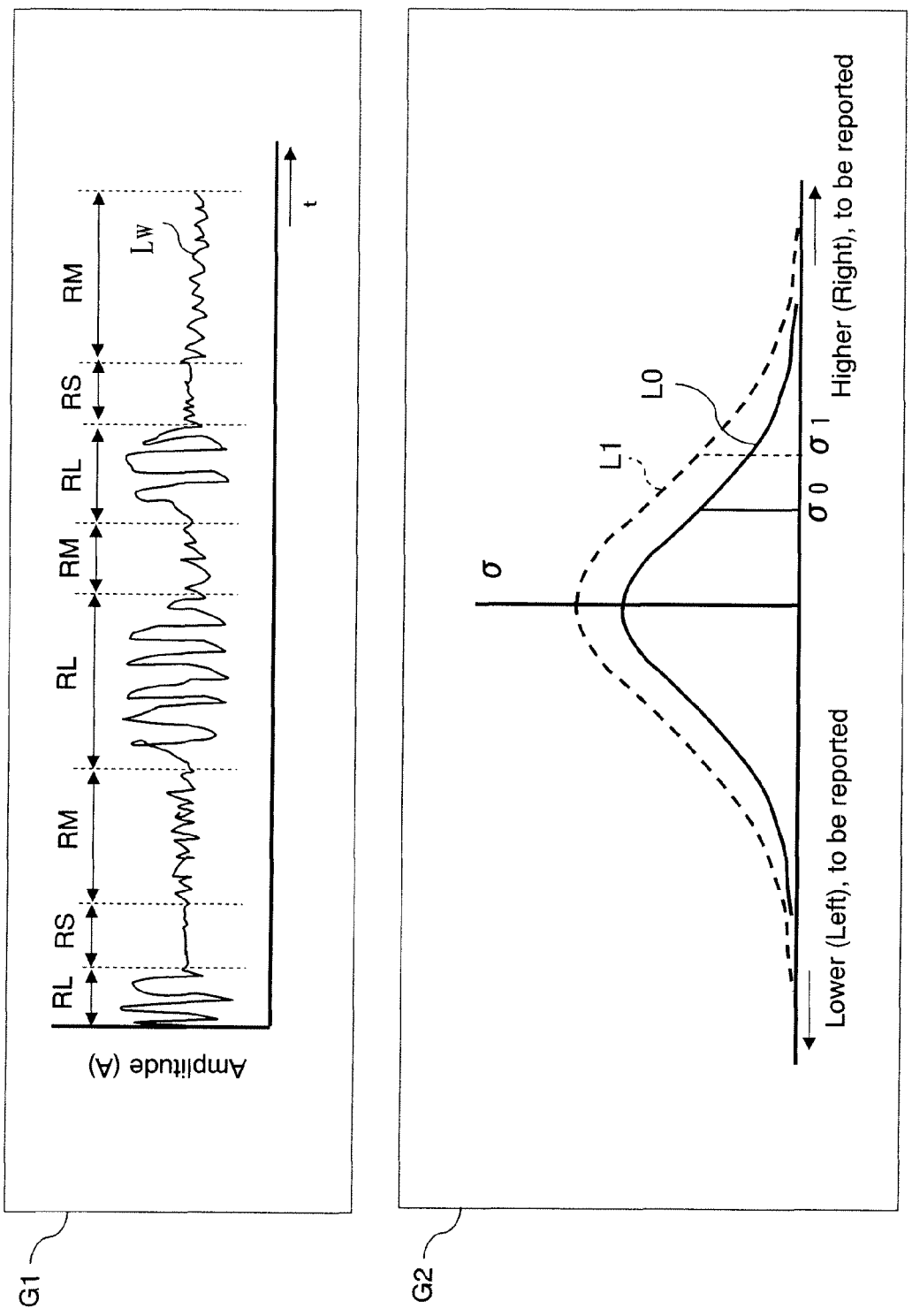
FIG. 6 is a diagram for explaining a function of a camerawork statistics portion.

In FIG. 6, graph G1 in the upper row represents fluctuations in the shaking of camera 101 over time. In this graph, the vertical axis denotes the output value from the gyro sensor, i.e., shake amplitude A, while the horizontal axis denotes the passage of time t. Note that wavy line Lw represents the shaking of the camera 101 at each time point. That is, the wavy line Lw represents the shaking behavior of the camera 101. The shaking behavior of the camera 101 is divided into three ranges, (L), (M), and (S), in accordance with the shake amplitude A (which takes, for example, an 8-bit value from 0 to 255). Specifically, an amplitude A of up to 15-fold corresponds to (S): small amplitude range RS, an amplitude A from 16- to 63-fold corresponds to (M): medium amplitude range RM, and an amplitude A of 64-fold or more corresponds to (L): large amplitude range RL. For example, in graph G1, the amplitude A of the camera 101 is first within the large amplitude range RL, and experiences a transition to the small amplitude range RS, and a further transition through the medium amplitude range RM, the large amplitude range RL, the medium amplitude range RM, the large amplitude range RL, and the small amplitude range RS to the medium amplitude range RM.

By the following arithmetic operation, it is possible to detect whether the shaking of the camera 101 is concentrated in the large amplitude range RL, the medium amplitude range RM, or the small amplitude range RS, or whether it is concentrated almost at the same ratio. Specifically, the fluctuations of the jiggle amplitude A are measured at predetermined intervals, e.g., 10 milliseconds (0.01 seconds), to calculate dispersion $\sigma$ of jiggle fluctuations during the period. Thereafter, based on the calculated dispersion $\sigma$, the camera microcomputer 206 computes the presence ratio among the large amplitude range RL, the medium amplitude range RM, and the small amplitude range RS, as well as the fluctuations of the jiggle amplitude A themselves.

In FIG. 6, graph G2 in the lower row represents an exemplary distribution density concerning the jiggling of the camera 101. Predicted dispersion of fluctuations in the jiggling of the camera 101 at an event to be shot, such as athletic meet, entrance ceremony, graduation ceremony, trip, recital, wedding ceremony, sports, indoor event, or outdoor event, is taken as $\sigma 0$, and dispersion of the jiggle fluctuations measured for that event is taken as $\sigma 1$. In graph G1, solid line L0 represents the dispersion behavior for $\sigma 0$, while dotted line L1 represents the dispersion behavior for $\sigma 1$. By comparing $\sigma 0$ and $\sigma 1$ together, it is possible to determine whether the jiggle in the camerawork is greater than or equal to a value set for the event, or whether the camerawork is rather static.

Specifically, the camera microcomputer 206 calculates the difference $\Delta\sigma$ between $\sigma 0$ and $\sigma 1$, and based on the result, a signal is generated to denote the jiggling status of the camerawork, for example, by an indication on the viewfinder. Concretely, the signal is generated to denote, for example, that the camerawork is rather static if $\Delta\sigma$ is less than 0.2, the camerawork is slightly shakier than an expected standard if $\Delta\sigma$ is between 0.2 and 0.5 inclusively, or the camerawork is significantly shakier than the expected standard if $\Delta\sigma$ is more than 0.5. Thus, it is possible to inform the camera operator as to the degree of panning, tilting, or instability in the camerawork.

Note that the jiggle of the camerawork can be determined with further finer levels of discernment. For example, five thresholds Th_1, Th_2, Th_3, Th_4, and Th_5 are set. The middle-level threshold Th_3 is used by default, and the threshold Th is changed dynamically or by user setting in accordance with shooting conditions, shooting modes, and events to be shot.

The determination as to whether the camera 101 is held in hand or stabilized will be described with reference to FIG. 7. The determination as to whether it is held in hand or stabilized is made by comparing dispersion σ of measured jiggle fluctuations to the threshold σ0, in terms of whether the dispersion σ is higher or lower.

Figure 7:
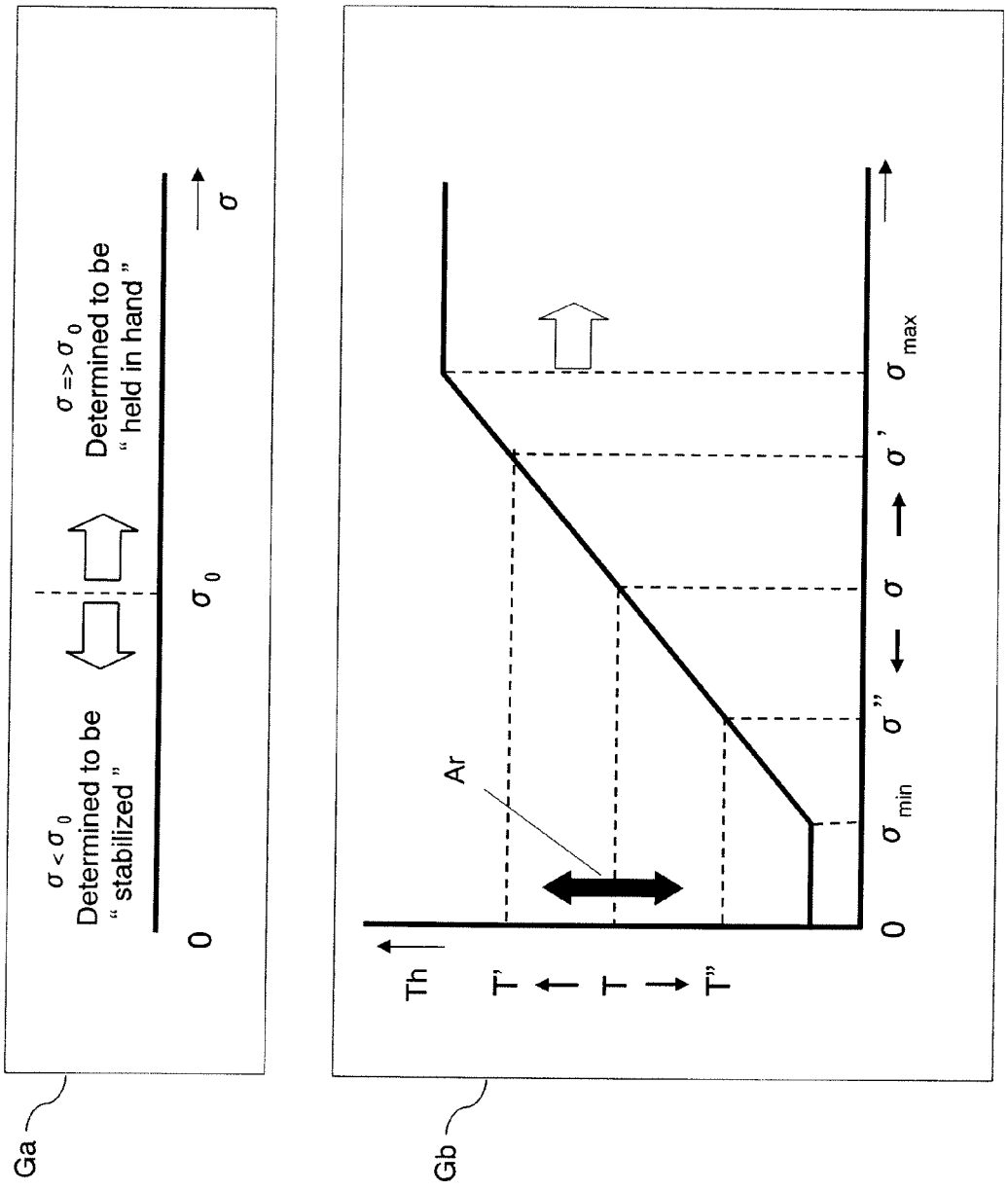
FIG. 7 is a diagram for explaining a function of the camerawork statistics portion.

In FIG. 7, graph Ga in the upper row represents the relationship between the determination and the dispersion value σ for data obtained in the case of camera shake. In the graph, if the dispersion value σ is equal to or more than the threshold σ, i.e., σ≧σ0, the judgment "held in hand" is made. On the other hand, if the dispersion value σ is less than the threshold σ, i.e., σ<σ0, the judgment "stabilized" is made.

Note that the threshold σ0 is not fixed, and can be automatically changed by the methods described with reference to FIGS. 4 and 5, such that the data classification rate approximates to a target value. Therefore, it is possible to reduce variations of data classification to, for example, ⅓ or less as compared to conventional variations. This relationship is shown in the lower row of FIG. 3 as graph Gb. In graph Gb, $\sigma_{max}$ denotes the maximum limit of camera shake, while $\sigma_{min}$ denotes the minimum detectable limit of camera shake. By changing the threshold Th as indicated by black arrow Ar, such that the data classification approximates to the target value, it is possible to reduce the variations of data classification.

Note that in the range where $\sigma > \sigma_{max}$, the camera 101 is excessively jiggled or abruptly panned. Countermeasures for such excessive jiggling and unstable jiggling are important, and therefore they are under study as techniques for preventing effects on living bodies. Examples thereof include:

ITU-R Recommendations BT.1702;

ISO IWA3 published in September 2005;

new VDT guidelines, April 2002; and the project "development of technology for preventing adverse effects of video on living bodies" by Ministry of Economy, Trade, and Industry, and Ministry of Internal Affairs and Communications, 2003 to 2005.

In addition, excessive jiggling of the camera, as well as video jiggle due to instability cause motion sickness, and therefore various evaluation techniques are under study. Examples thereof include:

subjective evaluation by SSQ (Simulator Sickness Questionnaire);

objective evaluation by measurement concerning brain functions, and autonomic nerve system; and comprehension of physical characteristics of video that causes motion sickness.

As for, in particular, horizontal or vertical translation parameters, analysis results for blurred video caused by camera shake have demonstrated that motion sickness is caused by frequency components in the range from about 0.5 Hz to 2 Hz, in particular, horizontal panning at 0.35 Hz to 1 Hz. As for rotation, motion at 30 to 70 degrees per second reportedly causes more severe motion sickness.

The likelihood of sickness being caused by rotational motion in one direction decreases according to the order: "roll", "pitch", and "yaw". Concretely, it has been reported that, in the case of large amplitude, motion sickness is readily caused by "roll" rotation at 60 degrees or less per second, "pitch" rotation at about 60 degrees per second, or "yaw" rotation at 90 degrees per second or more. Therefore, by detecting such rotation, it is possible to generate metadata representing the status of the rotation. In addition, it is possible to identify any invalid scene.

It is conceivable that the reason for the above phenomenon is because the "roll" motion directly comes into the human field of view, whereas the "pitch" and "yaw" motions in the field of view are treated as indirect nonvisual information. That is, information as to "pitch" and "yaw" is detected by the semicircular canals or the otoliths in the human vestibular system. Another conceivable reason is that "roll" and "pitch" involve changes in the direction of gravitational force, whereas "yaw" does not involve any change in the direction of gravitational force.

In the case of moving images where abrupt changes in the direction of motion occur without any blanks, motion sickness is readily caused. Insertion of blanks makes motion sickness less likely to occur even when the direction of motion changes. Therefore, if excessive camera shake is detected, it is possible to reduce the chances of motion sickness by generating a playlist such that only video images in one direction are detected and displayed.

In addition, if camerawork, such as camera shake, that is likely to induce motion sickness is detected, it is possible to provide sound or flashing light to give the shooter an alarm indicating, for example, that the camera is excessively jiggling, in accordance with the level of the camerawork.

Also, in the case of moving images, motion sickness readily occurs when the viewing angle is wide. Accordingly, camera shake is detected based on a signal from the gyro sensor that represents rotational accelerations with respect to "roll", "pitch", and "yaw", and global motion in video that occurs due to an abrupt change in the motion pattern of the camera, such as panning, tilting, zooming, and rolling, is calculated. Thereafter, time-frequency components of the global motion, as well as a motion speed at an expected viewing angle on the display, are calculated. Blurring caused by camera shake is then electronically removed to reduce the number of pixels in the vertical and horizontal directions of displayed video images, thereby reducing the chances of motion sickness, although the viewing angle is narrowed.

Note that in the case where a viewing screen size (e.g., 32 inches) and a viewing distance (e.g., 2 meters) are hypothetically set, and a threshold Thv for a horizontal/vertical parallel displacement velocity (e.g., a moving speed of ten or less pixels per frame) and a frequency threshold Thf (e.g., 0.5 Hz) are set, any state where the amount of detected image blurring exceeds the two thresholds Thv and Thf can be considered to be risky enough to cause motion sickness. Note that these thresholds Thv and Thf can be changed per shooting mode or per event to be shot.

In the case of the video that causes motion sickness, global motion and luminance of video change abruptly, forcing quick eye movement and pupil dilation/contraction, and therefore resulting in abnormal sensations in the autonomic nerve system, as well as fluctuations in heartbeat, blood pressure, and respiration. Local motion of people or moving objects in the video can also be the cause, and therefore an optical-flow analysis technique, in which thresholds are preset to represent statistical changes of pixels, may be used to detect whether local motion thresholds for people or moving objects in the video are exceeded, and generate metadata concerning their statuses.

Note that optical-flow analyses are analysis techniques capable of detecting panning, zooming, etc., by statistically analyzing a motion vector in units of pixel or pixel block, and such techniques have been published in academic papers in the fields of pattern recognition, video analysis, and so on. By adopting a probability density function for the status of displacement, as well as using a maximum likelihood method and a particle filter, it becomes possible to achieve a noise-robust displacement analysis on statuses of rotation and movement, as well as to achieve object tracking, so that more accurate metadata can be generated by inputting parameters representing the above-described camera motions.

Figure 8:
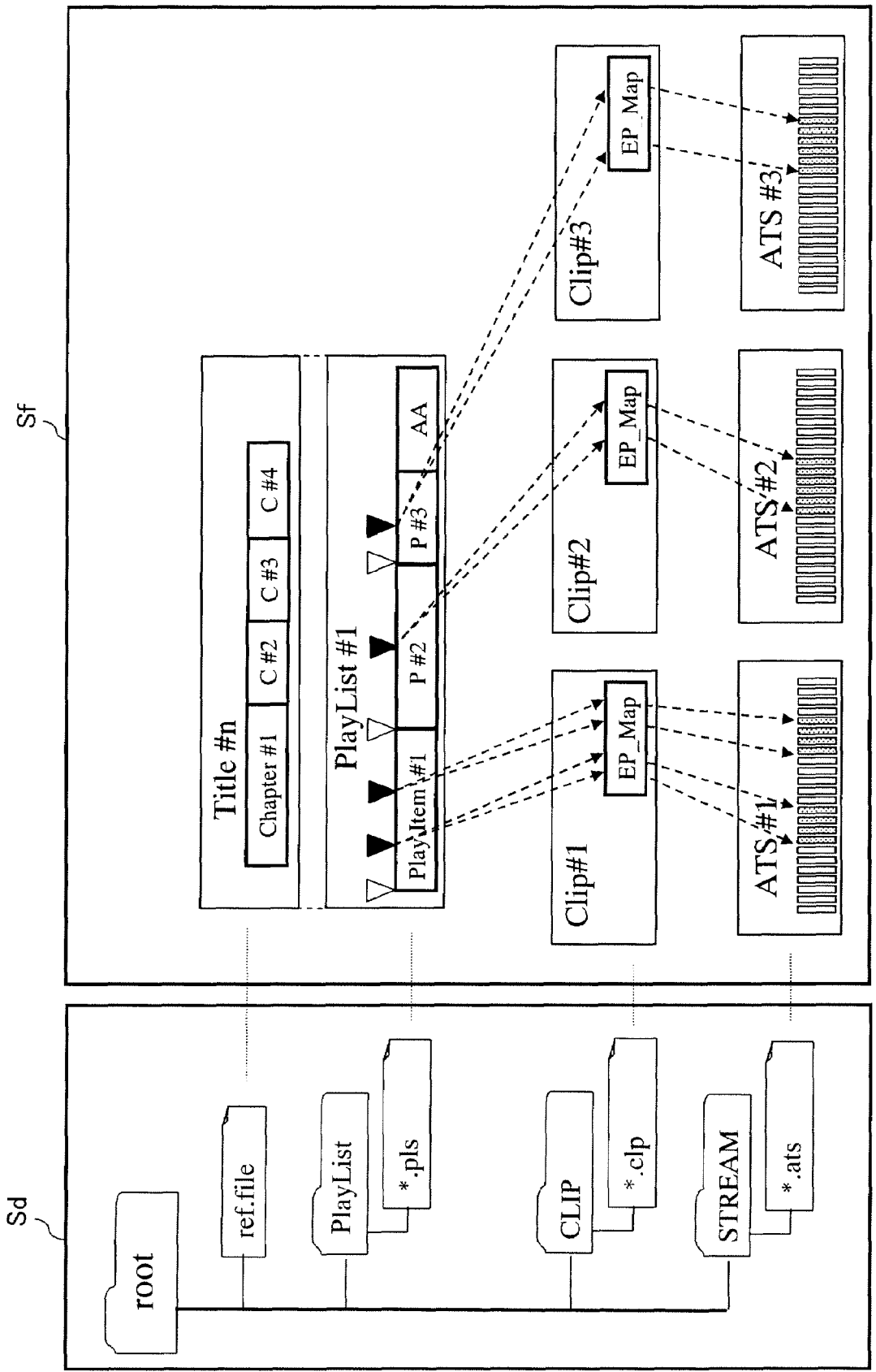
FIG. 8 is a diagram for explaining a directory structure and a file structure.

Next, an exemplary H.264/AVC file configuration will be described with reference to FIG. 8. A directory structure Sd is shown in the left rectangular block, and a file structure Sf is shown in the right rectangular block. These structures are constructed on an information recording medium, such as an SD card, a DVD-R, a DVD-RAM, or a BD-RE.

In the directory structure Sd, a reference file (ref.file), as well as "PlayList", "CLIP", and, "STREAM" directories, are present under root. A "*.pls" file, which is a playlist (file), is present under the "PlayList" directory. In addition, "*.clp" files, which are clip files, are present under the "CLIP" directory. "*.ats" files, which are stream files each composed of an ATS (192 bytes), are present under the "STREAM" directory.

In the file structure Sf, the reference file (ref.file) manages content title information (Title #n), as well as a plurality of pieces of chapter information (Chapter#1, C#2, C#3, C#4, . . . ). The playlist (PlayList#1) manages a plurality of pieces of playback part information (PlayItem#1, P#2, P#3, . . . ). In addition, the clip files (Clip#1, Clip#2, Clip#3, . . . ) have an EP map (EP_Map). The EP map is a map table for cross-reference between PTSs and ATS serial numbers of ATS packets contained in the stream files, and the EP map is used for interconversion between time codes and data positions, and therefore indispensable for playing back playlists, as well as editing stream files.

As described above, a title is correlated with a playlist file, the playlist file is correlated with a clip file, and the clip file is correlated with an ATS packet in a stream file.

The above-described real-time metadata and non-real-time metadata are mapped to SEI, and thereafter converted into ATS stream files. In addition, metadata generated by an arithmetic operation based on the real-time or non-real-time metadata is used as clip scene information to map additional information to part information or an auxiliary area AA of the playlist. Specifically, a list with a priority is mapped as playlist file auxiliary data to be referenced at the time of playing back shot content.

Thus, an important feature is provided, which makes it possible to refer to clip scene information metadata only by looking at data in the playlist file. Note that in the case of MPEG, the real-time metadata and the non-real-time metadata can be inserted into a private packet or a PMT.

In the case of the DVD-R, BD-RE/ROM, or AVCHD scheme, it is possible to carry out playback while skipping scenes with jiggle, i.e., scenes that might induce motion sickness. Specifically, scenes with excessive jiggle as described above are associated with time codes as metadata, and registered as markers for the playlist. A medium player conforming to a scheme as described above carries out playback with reference to marker information for the playlist or additional information of markers, such that scenes with jiggle are skipped.

By describing metadata associated with a time code TC as playlist information, it becomes possible for content playback equipment to instantaneously access (skip) a start or representative point of an event in shot content, such as an invalid scene or an important scene, with reference to information described in the playlist. In addition, by referring to a list of metadata, which is playlist file auxiliary data to be referenced at the time of playback, it becomes possible to sequentially play back a specified event section (an event section generated with reference to an event from the start to the end point).

In the case of generating a digest consisting of important scenes, it is also possible to generate a new playlist file by using digest scheme specification means for inputting specifications of scene priority, scene type, digest time length, or ratio of reduction to digest, or by referring to a scene list, which is playlist auxiliary data.

In the example shown in FIG. 1, a digest playlist consisting of important scenes includes three valid scenes:
(start time of Se1, end time of Se1)=(Se1$s$, Se1$e$);
(start time of Se2, end time of Se2)=(Se2$s$, Se2$e$); and
(start time of Se3, end time of Se3)=(Se3$s$, Se3$e$).

Furthermore, by referring to the playlist, it becomes possible to play back sections specified as important scenes in a normal manner, and other scenes at high speed. In addition, by referring to the playlist, it becomes possible to play back sections specified as invalid scenes at high speed, and other scenes at normal speed. Moreover, by referring to the playlist, it becomes possible that sections specified as invalid scenes are played back, such that detected representative scenes or previously shot and registered still images are each displayed for three seconds, and other scenes are played back at normal speed.

In the example in FIG. 1, if normal playback is performed for the valid scenes Se1, Se2, and Se3, and five-times faster playback is performed for the invalid scenes Sv1, Sv2, and Sv3, the playlist can be expressed as:
(start time of Se1, end time of Se1)=(Se1$s$, Se1$e$), normal playback;
(start time of Sv1, end time of Sv1)=(Sv1$s$, Sv1$e$), five-times faster playback;
(start time of Se2, end time of Se2)=(Se2$s$, Se2$e$), normal playback;
(start time of Sv2, end time of Sv2)=(Sv2$s$, Sv2$e$), five-times faster playback;
(start time of Se3, end time of Se3)=(Se3$s$, Se3$e$), normal playback; and
(start time of Sv3, end time of Sv3)=(Sv3$s$, Sv3$e$), five-times faster playback.

As for shot content, in particular children's music recital, in consideration of the desire to listen to piano performance, choral performance, etc., without interruption, but not to see invalid video that is jiggling or out-of-focus, it is possible to play back audio without interruption, while playing back substitution video, which contains representative scenes or previously shot and registered video images (blue skies, buildings, flowers, faces of children, etc.).

In the example in FIG. 1, if normal playback is performed for the valid scenes Se1, Se2, and Se3, and registered video images are played back at five-times higher speed for the invalid scenes Sv1, Sv2, and Sv3, the playlist can be expressed as:
(start time of Se1, end time of Se1)=(Se1$s$, Se1$e$), normal playback;
(start time of Sv1, of Sv1)=(Sv1 end time s, Sv1$e$), playback of registered video images;
(start time of Se2, end time of Se2)=(Se2$s$, Se2$e$), normal playback;
(start time of Sv2, end time of Sv2)=(Sv2$s$, Sv2$e$), playback of registered video images;
(start time of Se3, end time of Se3)=(Se3$s$, Se3$e$), normal playback; and
(start time of Sv3, end time of Sv3)=(Sv3$s$, Sv3$e$), playback of registered video images.

By providing means for generating video with reference to the playlist, such that horizontal jiggling and vertical jiggling in shot video that are caused by camerawork are removed from sections specified as invalid scenes, it is possible to carry out playback, such that video generated for sections specified as invalid scenes is displayed after image processing for removing image jiggle, and other scenes are played back at normal speed.

In addition, by changing the levels of the above-described thresholds Th for data classification, it becomes possible to display a playback time (clip period) per threshold. For example, in the case of the middle level (Th_3) of the five thresholds Th_1 to Th_5, the playback time is displayed for each shot clip. If the playback time is longer than expected, the level of the threshold Th is changed in such a manner as to shorten the playback time. Conversely, if the playback time is shorter than expected, the level of the threshold Th is changed in such a manner as to lengthen the playback time.

In the case of making further finer settings, the playback time of each scene contained in a clip is displayed when the threshold for that scene is at the mid level (Th_3) of the five thresholds Th_1 to Th_5. If the playback time is longer than expected, the level of the threshold Th can be changed in such a manner as to shorten the playback time. Conversely, if the playback time is shorter than expected, the level of the threshold Th can be changed in such a manner as to lengthen the playback time.

Also, if a total playback time is specified for a clip or a playlist, which is a collection of clips, it becomes possible to generate a playlist with approximately the same playback time as the specified time by creating a program for automatically setting a threshold per clip or scene.

By referring to a playlist, a new playlist, which consists of scenes at a predetermined priority level or higher, or scenes taken by specific camerawork, may be generated, and registered after a title is given thereto.

By referring to a playlist, it becomes possible to generate and play back background music in accordance with the type of each scene, such that the melody, tone and tempo of the background music are changed immediately before changing of scenes, thereby achieving more artistically- and culturally-refined content playback.

As described above, the content shooting apparatus according to the present invention makes it possible to appropriately calibrate thresholds for metadata generation by monitoring camerawork, such as panning and zooming, for a predetermined period of time during shooting of moving images. Furthermore, the camera-fixing status as to whether the camera is held in hand or stabilized by a tripod stand is automatically determined, and a threshold for determining whether camerawork is normal or abnormal can be automatically set. Thus, it is possible to classify valid scenes and invalid scenes in a finer manner, in accordance with the quality of camerawork, such as "held in hand" or "stabilized by a tripod stand", so that deletion of any invalid portions, which are misshots, as well as generation of a digest consisting of important shots, can be achieved with higher quality.

INDUSTRIAL APPLICABILITY

The present invention is applicable to content shooting apparatuses for use in shooting of moving images, and so on.

The invention claimed is:

1. A content shooting apparatus for converting content data containing video, audio, or data into a stream and recording the stream to a recording medium in combination with content-related metadata, the apparatus comprising:
    shooting means for shooting a subject and generating the content data;
    camerawork detection means for detecting movement of the shooting means;
    metadata generation means for comparing the detected movement with a predetermined value to generate the metadata; and
    calibration means for changing the predetermined value in accordance with the detected movement.

2. The content shooting apparatus according to claim 1, further comprising shooting means placement determination means for determining placement of the shooting means based on the movement detected during a predetermined period of time.

3. The content shooting apparatus according to claim 2, wherein the predetermined value is a noise power threshold of at least one of the following: a moving speed and a rotational speed for determining a fixing status of the shooting means, the apparatus further comprising means for comparing a square mean value of either a moving speed or a rotational speed of the shooting means, or both, with the noise power threshold.

4. The content shooting apparatus according to claim 3, wherein, when an operation power supply for the shooting means is on, the noise power threshold is a value computed based on at least one of the moving speed and the rotational speed of the shooting means, which are detected during a predetermined period of time before shooting is started.

5. The content shooting apparatus according to claim 3, wherein, when an operation power supply for the shooting means is on, the noise power threshold is an externally provided value.

6. The content shooting apparatus according to claim 5, further comprising camerawork determination means for determining whether camerawork of the shooting means is normal based on a result of comparing the detected movement with a predetermined value, wherein,
    the calibration means performs control, such that proportion of a determination that the camerawork is normal falls within a predetermined range, by comparing the square mean value of either the moving speed or the rotational speed of the shooting means, or both, with the externally provided noise power threshold, and decreasing the predetermined value if the square mean value is less than or equal to the noise power threshold, or increasing the predetermined value if the square mean value is more than the noise power threshold.

7. The content shooting apparatus according to claim 5, further comprising camerawork determination means for determining whether camerawork of the shooting means is normal based on a result of comparing the detected movement to a predetermined value, wherein,
    the calibration means performs control, such that proportion of a determination that the camerawork is abnormal falls within a predetermined range, by comparing a square mean value of either the moving speed or the rotational speed of the shooting means, or both, with the externally provided noise power threshold, and decreasing the predetermined value if the square mean value is less than or equal to the noise power threshold, or increasing the predetermined value if the square mean value is more than the noise power threshold.

8. The content shooting apparatus according to claim 1, further comprising an angular velocity sensor for detecting a rotational angular velocity of the shooting means, wherein the movement is detected based on the detected rotational angular velocity.

9. The content shooting apparatus according to claim 1, further comprising content classification means for classifying video or audio corresponding to the detected movement as invalid content when the detected movement is greater than the predetermined value.

10. The content shooting apparatus according to claim 9, wherein,
the shooting means includes:
a lens portion for generating an optical image of the subject;
an image sensor for generating image data based on the optical image; and
imaging portion control means for controlling operations of the lens portion and the image sensor, and
the movement is detected based on at least one of the following: a zooming value, an aperture value, a focal distance, and a shutter speed of the lens portion.

11. The content shooting apparatus according to claim 10, further comprising control means for correlating at least one of the following with corresponding content as metadata: the zooming value, the aperture value, the focal distance, the shutter speed, classification information from the content classification means, a time code of the video, and a time code of the audio.

12. The content shooting apparatus according to claim 1, further comprising:
camerawork determination means for determining whether camerawork of the shooting means is normal based on a result of comparing the detected movement to a predetermined value; and
means for generating an alarm signal when proportion of a determination that the camerawork is abnormal exceeds a predetermined range, the alarm signal indicating that the camerawork is abnormal.

13. The content shooting apparatus according to claim 1, further comprising means for generating a playlist to control playing back of content from the information storage medium based on the metadata.

14. The content shooting apparatus according to claim 1, further comprising means for generating edit information to edit content recorded on the information storage medium based on the metadata.

* * * * *